A. J. Peavey,
Governor.

No. 106,400. Patented Aug. 16, 1870.

Witnesses: Frank H. Parker, Alfred Jones

Inventor: Andrew J. Peavey

United States Patent Office.

ANDREW J. PEAVEY, OF BOSTON, MASSACHUSETTS, ASSIGNOR FOR THREE-FOURTHS OF HIS RIGHT TO GEORGE F. POTTLE, OF SAME PLACE.

Letters Patent No. 106,400, dated August 16, 1870.

IMPROVEMENT IN GOVERNORS FOR STEAM-ENGINES.

The Schedule referred to in these Letters Patent and making part of the same.

To all whom it may concern:

I, ANDREW J. PEAVEY, of Boston, in the county of Suffolk and State of Massachusetts, have invented a certain new and useful Improvement in Governors for Steam-Engines, &c., of which the following is a specification.

Nature and Object of the Invention.

The nature of my invention consists of combining in a closed vessel, which is filled with some suitable fluid, a revolving diaphragm and a series of self-adjusting buttresses, the diaphragm being driven by a belt from the engine to be regulated, while the buttresses are in communication with a counterbalance and cut-off, the object of the device being to take advantage of the flow of fluid caused by the revolving diaphragm, i. e., to use the force due to the current thus caused for the purpose of giving motion to the buttresses, and thus to operate upon the cut-off device, the force of said current being proportional to its velocity, and dependent upon the velocity of the engine.

Description of the Accompanying Drawing.

General Description.

I construct my invention as follows:

H is a hollow cylinder, to be closed at each end and packed, so as to hold oil or some suitable fluid for the fan-wheel A A A A to revolve in.

W' is a shaft, driven by a belt on the pulley W. This shaft carries the fans A A A A.

Figure 1:
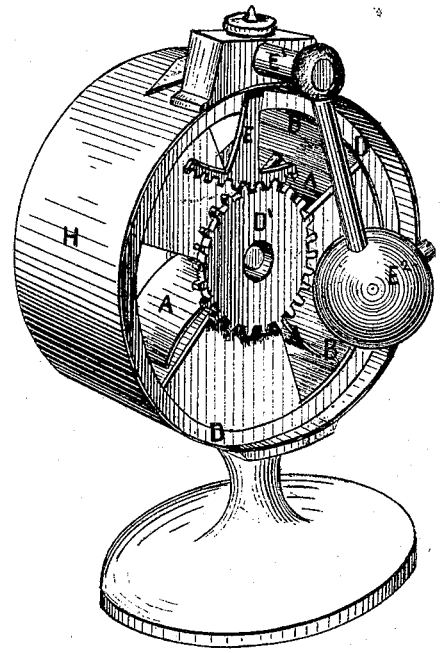
Figure 1 is a perspective view, showing my device with a part of the front head removed, to show more clearly the interior.
Figure 2:
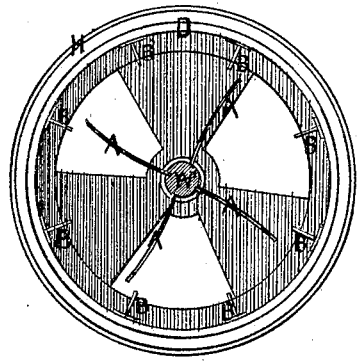
Figure 2 is a cross-section of the invention.

D D is a cylinder having open ends, as shown in figs. 1 and 2. This cylinder D is hung loosely on the shaft W', so that it may revolve independently of it.

Figure 3:
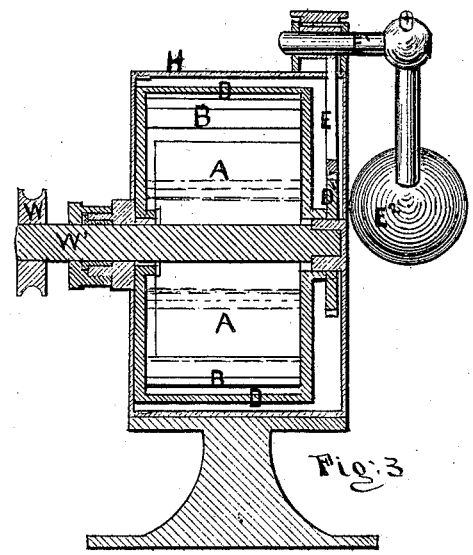
Figure 3 is a longitudinal vertical section.

D', figs. 1 and 3, is a gear-wheel attached to and revolving with the cylinder D.

E, figs. 1 and 3, is a segment-gear hung upon the spindle $E^1$ and meshing with the gear-wheel D'.

$E^2$ is a counter-balance hung upon the spindle $E^1$.

The interior of the cylinder D is provided with a series of buttresses, B B B B, which extend inwardly, as shown in fig. 2, but not far enough to prevent the revolution of the fan-wheel A A A A.

In practice some device is attached to the spindle $E^1$ for the purpose of transmitting motion to the throttle-valve of the engine, or, in case this governor is used for a water-wheel, to the gate or cut-off.

The operation of my invention is as follows:

The cylinder H being filled with oil or some other suitable fluid, the fan-wheel A A revolves in it with a velocity dependent upon that of the engine. This revolution of the fan-wheel causes a flow of oil against the buttresses B B B B of the cylinder D, which action causes the cylinder D to revolve, which transmits its motion, through the gear D' and segment-gear E, to the spindle $E^1$ and counter-balance $E^2$.

From inspection of the above, it will be seen that the force which the flowing fluid exerts against the buttresses B B B B will be dependent upon the velocity of the fan-wheel A A A A, and that the buttress-cylinder D will move with a force also in proportion to this velocity, and will be checked in its motion by the counter-balance $E^2$, acting through the shaft $E^1$ and segment-gear E. Therefore, if, by any suitable mechanical device, the shaft $E^1$ be connected to a cut-off or throttle-valve, it will serve to regulate the speed of the engine, &c.

I claim as my invention—

The combination of the fan-wheel A A and the buttress-cylinder D D, operating in confined fluid, one upon the other, substantially as described, and for the purpose set forth.

ANDREW J. PEAVEY.

Witnesses:
 FRANK G. PARKER,
 ALFRED JONES.